(12) United States Patent
    Meric

(10) Patent No.: US 7,974,307 B2
(45) Date of Patent: Jul. 5, 2011

(54) METHODS AND APPARATUS FOR DATA DECODING/ENCODING AND FOR SEARCHING FOR/INSERTING STUFFING BYTES

(75) Inventor: Ender Meric, Manisa (TR)

(73) Assignee: Vestel Elektronik Sanayi Ve Ticaret A.S., Manisa (TR)

( * ) Notice: Subject to any disclaimer, the term of this patent is extended or adjusted under 35 U.S.C. 154(b) by 142 days.

(21) Appl. No.: 11/942,493

(22) Filed: Nov. 19, 2007

(65) Prior Publication Data

US 2008/0130735 A1    Jun. 5, 2008

Related U.S. Application Data

(60) Provisional application No. 60/867,696, filed on Jan. 24, 2007, provisional application No. 60/867,824, filed on Nov. 30, 2006.

(51) Int. Cl.
    *H04J 15/00* (2006.01)
(52) U.S. Cl. ..................................................... 370/464
(58) Field of Classification Search .................. 370/464, 370/474–476, 498, 503–506; 382/232, 233, 382/244, 248
    See application file for complete search history.

(56) References Cited

U.S. PATENT DOCUMENTS

| 7,248,740 B2 * | 7/2007 | Sullivan | 382/232 |
| 7,436,328 B2 * | 10/2008 | Zhou | 341/50 |
| 7,505,485 B2 * | 3/2009 | Sullivan et al. | 370/474 |
| 2005/0007263 A1 | 1/2005 | Zhou | |

OTHER PUBLICATIONS

Belinda Farmer, Video compression using ITU-T recommendation H.264, University of Southern Qeensland, Oct. 2005, pp. 1-146.*
Annex B: Byte stream format to Advanced video coding for generic audiovisual services, H-264, Series H; Audiovisual and Multimedia Systems Infrastructure of audiovisual services—Coding of moving video, ITU-T Telecommunication Standardization Sector of ITU, pp. 212-214 (May 2003).
Annex B: Byte stream format to Advanced video coding for generic audiovisual services, H-264, Series H; Audiovisual and Multimedia Systems Infrastructure of audiovisual services—Coding of moving video, ITU-T Telecommunication Standardization Sector of ITU pp. 262-263 (Mar. 2005).
Advanced video coding for generic audiovisual services, H-264, Series H; Audiovisual and Multimedia Systems Infrastructure of audiovisual services—Coding of moving video, ITU-T Telecommunication Standardization Sector of ITU, pp. 310-311 (Mar. 2009).

* cited by examiner

*Primary Examiner* — Dmitry H Levitan
(74) *Attorney, Agent, or Firm* — Conley Rose, P.C.

(57) ABSTRACT

In a method of decoding data that contains payload data, start codes and stuffing data that prevents emulation of start codes within the data, and correspondingly in a method of encoding data that contains payload data and start codes, data is read or written. Substantially simultaneously with reading or writing the data, the data is checked for the presence of stuffing data which are to be discarded or the need to insert stuffing data as the case may be. In preferred embodiments, one or more state machines are used to track the need to discard/insert stuffing data.

6 Claims, 6 Drawing Sheets

Decoder State Machine

Decoder Read and Emulation Prevention

Encoder Write and Emulation Prevention

Decoder Bitstream

Decoder State Machine

Encoder Bitstream

Encoder State Machine

METHODS AND APPARATUS FOR DATA DECODING/ENCODING AND FOR SEARCHING FOR/INSERTING STUFFING BYTES

CROSS-REFERENCE TO RELATED APPLICATIONS

This application claims the benefit of priority to U.S. application Ser. No. 60/867,696 filed Nov. 29, 2006 and U.S. application Ser. No. 60/867,824 filed on Nov. 30, 2006, the content of which are hereby incorporated by reference in there entirety for all purposes.

FIELD OF INVENTION

The inventions relate to a method and apparatus for data decoding, to a method and apparatus for data encoding, to a method and apparatus for detecting stuffing bytes in encoded data, and to a method and apparatus for inserting stuffing bytes into data.

BACKGROUND

The invention has particular applicability to video/audio data encoding and decoding.

Digital data is typically transmitted from some type of transmitter to some type of receiver. A transmitter typically includes an encoder that encodes the data for transmission and a receiver correspondingly typically includes a decoder that decodes data that it receives. There are many different types of digital data, including for example video data, audio data, audio/video data, text data, computer-executable program data, archival data, database information, and the like. When digital data is transmitted, it is typically transmitted in (or "on" or "over") some type of channel, which may be carried wirelessly or over "wires" (or cables, etc.). Equivalently, computer memory or any storage device or storage medium can be considered a transmission channel for present purposes.

When digital data is transmitted, it is often important to be able to find specific points within the data in the channel. This is for various purposes, such as to locate points that enable recovery from errors or losses in the transmission of the data through the channel, to locate points that enable starting of the decoding process at a location other than the start of the entire stream, or to locate points that enable searching for different types of data that are utilised for different purposes. Thus, for example, on the decoder side, decoders and other components that process digital data often need to know the context of the data so that the data can be properly processed.

In principle, it might be possible for a decoder to start with the first bit that was sent and then simply track the information that was being sent according to the format of the data. Unfortunately, this ideal situation rarely occurs in practice. For example, errors in the transmission of the data may occur, causing drop-out of data and preventing the decoder correctly tracking the transmitted data. In other cases, such as when tuning into an ongoing broadcast stream of data, the decoder can not start at the beginning of the data transmission. Locating points by data format parsing may also require a significant amount of complex processing in a decoder.

In many types of channel environments, such issues are addressed by providing, in the data, so-called resynchronisation markers. Resynchronisation markers provide a mechanism by which a system can start its decoding process and/or recover from an error. For example, when digital data is streamed as a series of bits or bytes, having resynchronisation markers in the stream can provide a decoder with a point of reference from which to recover in the event of an error occurring in the transmission.

One way that resynchronisation markers can be employed is in the context of "start codes". A start code is a string of bits or bytes having a specific value. Many systems (e.g. those complying with the H.264 and MPEG-2 video coding standards) tend to carry bytes so that start codes can be defined as a uniquely-valued string of bytes. The unique string of bytes provides a pattern the presence of which indicates a resynchronisation point. A resynchronisation point typically indicates the start or boundary of some independently decodable amount of data. For example, in H.264 video data, resynchronisation points can indicate the start of a "slice" (i.e. an independently decodable region) of a picture, the start of a picture, the start of a "GOP" (i.e. "Group of Pictures" or independently decodable sequence of pictures), or the start of a new video sequence. Digital video streams can also include so-called ancillary or supplemental data which can be preceded by a start code. (Unless the context requires otherwise, as the term "start code" is commonly used in the art, the term will be used herein to include video data start codes and other types of resynchronisation marker.)

In more detail, in H.264 the video element bitstream is defined in the form of network abstraction layer (NAL) units. A NAL unit is a syntax structure containing an indication of the type of data to follow and bytes containing that data in the form of a raw byte stream payload (RBSP) interspersed as necessary with emulation prevention bytes (see below). The NAL unit could be a sequence header, a picture header, and a slice with header and data. In the byte stream format described in Annex B of H.264, the start code is defined as byte-aligned 0x000001 (i.e. twenty-three 0 bits followed by a single 1 bit). (A position in a bitstream is "byte-aligned" when the position is an integer multiple of 8 bits from the position of the first bit in the bitstream.) The byte stream format consists of a sequence of byte stream NAL unit syntax structures. Each byte stream NAL unit syntax structure contains one three-byte start code prefix (0x000001) followed by one nal_unit (NumBytesInNALunit) syntax structure. In accordance with H.264 Annex B, decoding the byte stream to yield NAL units has the following steps:

1. find the next 0 byte plus three-byte start code (0x000001), and discard the 0 byte;
2. discard the three-byte start code;
3. NumBytesInNALunit is set equal to the number of bytes up to and including the last byte preceding one of: a sequence of three 0 bytes, the next start code, or the end of the byte stream;
4. NumBytesInNALunit bytes are removed from the byte stream and are decoded using the NAL unit decoding process;
5. when the next three bytes are not a start code (otherwise go to step 2) and the next four bytes are not a 0 byte plus a start code (otherwise go to step 1), repeatedly discard a 0 byte until a 0 byte plus a start code are found and then go to step 1.

The NAL unit is then decoded.

As will be appreciated, it can happen that the data that is being transmitted includes by chance a series of bits or bytes that is the same as a resynchronisation marker, such as a start code. If that occurs, the decoder could be fooled into thinking that what is image or other payload data is actually a start code and will therefore decode the payload data incorrectly. This is referred to in the art as "emulation" because ordinary payload data is emulating a start code.

In order to avoid emulation of the three-byte start code within the NAL unit in H.264, certain rules are defined. First, the last byte of a NAL unit shall not be equal to 0x00. Secondly, within a NAL unit, the following three-byte sequences shall not occur at any byte-aligned position:

0x000000
0x000001
0x000002
0x000003

Finally, within a NAL unit, any four-byte sequence that starts with the three bytes 0x000003 other than the following sequences shall not occur at any byte-aligned position:

0x00000300
0x00000301
0x00000302
0x00000303

An encoder can produce a NAL unit from RBSP data (RBSP data is the raw bitstream data of an NAL unit before undergoing the following procedure) by the following procedure.

The RBSP data is searched for byte-aligned bits of the following binary patterns:

"00000000 00000000 000000xx" (where xx represents any 2 bit pattern: 00, 01, 10, or 11), and a byte equal to 0x03 is inserted between the second and third bytes to replace these bit patterns with the bit patterns "00000000 00000000 00000011 000000xx"; and, finally, when the last byte of the RBSP data is equal to 0x00, a final byte equal to 0x03 is appended to the end of the data.

Thus, in a NAL unit, in the encoder, the sequences mentioned above are "stuffed" with the byte 0x03 (known as a "stuffing byte") to prevent start code emulation and the four-byte bit-aligned codes with 0x000003 cannot occur in a bitstream. Thus, the codes mentioned above become:

1. 0x00000300
2. 0x00000301
3. 0x00000302
4. 0x00000303

During decoding, a decoder shall recognise the stuffing byte 0x03 in a bit-aligned sequence of 0x000003 and discard it from the bitstream. The prior art method operates on bit-level streams. The bit-handling functions, such as "get_bits_ep", "put_bit_ep" and "next bits_ep", which are used for reading and writing on a stream, handle the emulation prevention process. While reading or writing to a stream, an updated number of zeros is used for determining possible emulation.

In particular, referring to the prior art decoder shown schematically in FIG. 1, in step 10, the emulation prevention is done when a possible emulation is true. To determine pre-emulation, the number of zeros and read length are used. If the possible emulation flag is true, the prevention step is executed. Else, step 40 is executed.

In step 20, the bit-handling functions look for emulation prevention and a stuffing byte in the pointer ranges. If the bitstream sequence includes a stuffing byte, step 30 is executed. Else, step 40 is executed.

In step 30, the stuffing byte for emulation prevention is discarded according to the bitstream position and pointer.

In step 40, the number of zeros is updated according to read value. If the value is zero, the read length is added to number of zeros. The maximum number for non-zero value is length-1, so the number of zero becomes read_length-1.

This approach means that the number of consecutive zeros has to be counted, which can be time-consuming and is in fact not necessary most of the time given that stuffing bytes in practice only represent a small part of the number of bytes that are present in the data. An alternative is to extract NAL units from the bitstream and pre-search the NAL unit for stuffing bytes. However, this has a time and processing cost given that it requires a pre-search of all of the NAL units in a bitstream.

According to a first aspect of the invention, there is provided a method of decoding data that contains payload data, start codes and stuffing data that prevents emulation of start codes within the data, the method comprising, prior to decoding the data:

(a) reading a portion of the data for decoding of the data;

(b) substantially simultaneously with reading said portion of the data for decoding of the data, checking said portion of the data for the presence of stuffing data;

(c) if stuffing data is present, discarding the stuffing data from said portion of the data;

(d) repeating steps (a) to (c) for further portions of the data; and, (e) decoding the remaining data.

The overhead that is normally associated with emulation prevention is reduced in this aspect by virtue of combining the decoder read operation with the operation of checking for the presence of stuffing data. The need to search through and/or count zeroes as in the prior art is avoided. Also, in the preferred embodiment, the number of load operations is reduced because the bit stream is parsed only once. As a result, cache misses are also reduced. The emulation prevention control procedure does not need extra read or write operations because control is done over the already-read byte(s) (or the ready-for-write byte(s) in the encoder process discussed below) during the decoder read procedure.

Preferably the checking is only carried out when said portion of the data is byte-aligned. This is particularly applicable to H.264-type encoded data and provides a natural speed optimisation in that a pre-search of a sequence in a stream as in the prior art is avoided.

Preferably a state machine is used during the reading and checking steps. This approach adds only a small cyclic overhead as the state machine conditions are rarely true, so the cost of the check operation is less than the cost of searching or counting consecutive zeroes as in the prior art.

Preferably the state of the state machine is unchanged in the case that said portion of the data that is read is not byte-aligned. This helps to decrease the total amount of state control that is used during a bit-wise read/write operation for H.264 in particular.

In an embodiment, an end state of the state machine indicates that stuffing data has been located in said portion of the data.

Preferably the state of the state machine is checked, and possibly changed, only when one or more complete bytes of data have been read for decoding of the data. Again, this helps to decrease the total amount of state control that is used during a bit-wise read/write operation.

Preferably the state of the state machine changes if the data read for decoding of the data includes one of the bytes 0x00 and 0x03 where 0x03 is a stuffing byte.

In one preferred embodiment, the state machine has four states, said states being:

a first state State_0 which is a start state;

a second state State_1 to which the state machine moves in the case that the state machine was in State_0 and the next byte read is 0x00;

a third state State_2 to which the state machine moves in the case that the state machine was in State_1 and the next byte read is 0x00, else the state machine reverting to State_0 in the case that the state machine was in State_1 and the next byte read is not 0x00; and, a fourth state State_3, which is an end state, to which the state machine moves in the case that the state machine was in State_2 and the next byte read is 0x03 where 0x03 is a stuffing byte, else the state machine reverting to State_0 in the case that the state machine was in State_2 and the next byte read is not 0x03.

According to a second aspect of the invention, there is provided a decoder for decoding data that contains payload data, start codes and stuffing data that prevents emulation of start codes within the data, the decoder comprising:

a data checker; and, a data decoder;

and being constructed and arranged so as, prior to decoding the data:

(a) to read a portion of said data for decoding of the data;

(b) substantially simultaneously with reading said portion of the data for decoding of the data, to check said portion of the data for the presence of stuffing data;

(c) if stuffing data is present, to discard the stuffing data from said portion of the data;

(d) to repeat steps (a) to (c) for further portions of the data; and, (e) to decode the remaining data.

Preferred embodiments of the decoder correspond to preferred embodiments of the decoding method described above.

According to a third aspect of the invention, there is provided a method of encoding data that contains payload data and start codes, the method comprising, prior to encoding the data:

(a) writing a portion of the data for encoding of the data;

(b) substantially simultaneously with writing said portion of the data for encoding of the data, checking said portion of the data for the presence of code that emulates said start codes;

(c) if start code-emulating data is present, inserting stuffing data into said portion of the data;

(d) repeating steps (a) to (c) for further portions of the data; and, (e) encoding the data.

As for the decoder side, the overhead that is normally associated with emulation prevention is reduced in this aspect by virtue of combining the encoder read operation with the operation of checking for the need to insert stuffing data. The need to search through and/or count zeroes as in the prior art is avoided.

Preferably the checking is only carried out when said portion of the data is byte-aligned.

Preferably a state machine is used during the writing and checking steps.

Preferably the state of the state machine is unchanged in the case that said portion of the data that is written for encoding of the data is not byte-aligned. This helps to decrease the total amount of state control that is used during a bit-wise read/write operation for H.264 in particular.

In an embodiment, an end state of the state machine indicates that stuffing data needs to be inserted into said portion of the data.

Preferably the state of the state machine is checked, and possibly changed, only when one or more complete bytes of data have been written for encoding of the data.

Preferably the state of the state machine changes if the data written for encoding of the data includes one of the bytes 0x00, 0x01, 0x02 and 0x03.

In one preferred embodiment, the state machine has four states, said states being:

a first state State_0 which is a start state;

a second state State_1 to which the state machine moves in the case that the state machine was in State_0 and the next byte written is 0x00;

a third state State_2 to which the state machine moves in the case that the state machine was in State_1 and the next byte written is 0x00, else the state machine reverting to State_0 in the case that the state machine was in State_1 and the next byte written is not 0x00; and, a fourth state State_3, which is an end state, to which the state machine moves in the case that the state machine was in State_2 and the next byte written is 0x00, 0x01, 0x02 or 0x03, else the state machine reverting to State_0 in the case that the state machine was in State_2 and the next byte written is not 0x00, 0x01, 0x02 or 0x03;

and wherein, when in the fourth state State_3 and the next byte written is 0x00 the state machine moves to the second state State_1, and when in the fourth state State_3 and the next byte written is not 0x01, 0x02 or 0x03 the state machine moves to the first state State_0.

According to a fourth aspect of the invention, there is provided an encoder for encoding data that contains payload data and start codes, the encoder comprising:

a data checker; and, a data encoder;

and being constructed and arranged so as, prior to encoding the data:

(a) to write a portion of the data for encoding of the data;

(b) substantially simultaneously with writing said portion of the data for encoding of the data, to check said portion of the data for the presence of code that emulates said start codes;

(c) if start code-emulating data is present, to insert stuffing data into said portion of the data;

(d) to repeat steps (a) to (c) for further portions of the data; and, (e) to encode the data.

Preferred embodiments of the encoder correspond to preferred embodiments of the encoding method described above.

According to a fifth aspect of the invention, there is provided a method of detecting stuffing bytes in encoded data, the method comprising reading the encoded data for decoding of the data and to look for stuffing bytes in the encoded data, the method using a state machine whilst reading the encoded data to track when a stuffing byte in the encoded data is encountered.

Because in this aspect, a state machine is used and the state machine conditions in practice are rarely true, the cyclical overhead is small and so the cost of the check operation to look for stuffing bytes is less than the cost of searching or counting consecutive zeroes operation as in the prior art.

Preferably the state of the state machine is unchanged in the case that a portion of the encoded data that is read for decoding of the data is not byte-aligned.

Preferably an end state of the state machine indicates that stuffing data has been located in said portion of the data.

Preferably the state of the state machine is checked, and possibly changed, only when one or more complete bytes of data have been read for decoding of the data.

Preferably the state of the state machine changes if the data read for decoding of the data includes one of the bytes 0x00 and 0x03 where 0x03 is a stuffing byte.

Preferably the state machine has four states, said states being:

a first state State_0 which is a start state;

a second state State_1 to which the state machine moves in the case that the state machine was in State_0 and the next byte read is 0x00;

a third state State_2 to which the state machine moves in the case that the state machine was in State_1 and the next byte read is 0x00, else the state machine reverting to State_0 in the case that the state machine was in State_1 and the next byte read is not 0x00; and, a fourth state State_3, which is an end state, to which the state machine moves in the case that the state machine was in State_2 and the next byte read is 0x03 where 0x03 is a stuffing byte, else the state machine reverting to State_0 in the case that the state machine was in State_2 and the next byte read is not 0x03.

According to a sixth aspect of the invention, there is provided apparatus for detecting stuffing bytes in encoded data, the apparatus comprising a reader for reading encoded data for decoding of the data and to look for stuffing bytes in the encoded data, the apparatus having a state machine which is used whilst reading the encoded data for decoding of the data to track when a stuffing byte in the encoded data is encountered.

Preferred embodiments of the stuffing byte-detecting apparatus correspond to preferred embodiments of the stuffing byte-detecting method described above.

According to a seventh aspect of the invention, there is provided a method of inserting stuffing bytes into data that contains payload data and start codes, the method comprising writing the data for encoding of the data and to look for the presence of code that emulates said start codes, the method using a state machine whilst writing the data for encoding of the data to track when a stuffing byte needs to be inserted into the data to avoid code that emulates start codes being present in the data.

Again, because in this aspect, a state machine is used and the state machine conditions in practice are rarely true, the cyclical overhead is small and so the cost of the check operation to look for the need to insert stuffing bytes is less than the cost of searching or counting consecutive zeroes operation as in the prior art.

Preferably the state of the state machine is unchanged in the case that a portion of the data that is written for encoding of the data is not byte-aligned.

Preferably an end state of the state machine indicates that a stuffing byte needs to be inserted into the data.

Preferably the state of the state machine is checked, and possibly changed, only when one or more complete bytes of data have been written for encoding of the data.

Preferably the state of the state machine changes if the data written for encoding of the data includes one of the bytes 0x00, 0x01, 0x02 and 0x03.

Preferably the state machine has four states, said states being:

a first state State_0 which is a start state;

a second state State_1 to which the state machine moves in the case that the state machine was in State_0 and the next byte written is 0x00;

a third state State_2 to which the state machine moves in the case that the state machine was in State_1 and the next byte written is 0x00, else the state machine reverting to State_0 in the case that the state machine was in State_1 and the next byte written is not 0x00; and, a fourth state State_3, which is an end state, to which the state machine moves in the case that the state machine was in State_2 and the next byte written is 0x00, 0x01, 0x02 or 0x03, else the state machine reverting to State_0 in the case that the state machine was in State_2 and the next byte written is not 0x00, 0x01, 0x02 or 0x03;

and wherein, when in the fourth state State_3 and the next byte written is 0x00 the state machine moves to the second state State_1, and when in the fourth state State_3 and the next byte written is not 0x01, 0x02 or 0x03 the state machine moves to the first state State_0.

According to an eighth aspect of the invention, there is provided apparatus for inserting stuffing bytes into data that contains payload data and start codes, the apparatus comprising a writer for writing the data for encoding of the data and to look for the presence of code that emulates said start codes, the apparatus having a state machine which is used whilst writing the data for encoding of the data to track when a stuffing byte needs to be inserted into the data to avoid code that emulates start codes being present in the data.

BRIEF DESCRIPTION OF THE DRAWINGS

Preferred embodiments of the stuffing byte-insertion apparatus correspond to preferred embodiments of the stuffing byte-insertion method described above.

Embodiments of the invention will now be described by way of example with reference to the accompanying drawings, in which.

The invention has particular applicability to emulation prevention of start codes in video/audio data, including in particular data that is encoded and decoded in accordance with the H.264 and similar (past or future) (video) coding standards. Nevertheless, the present invention is applicable widely to encoding and decoding any data that has resynchronisation markers and preventing emulation of the resynchronisation markers by the data.

The preferred embodiments use a buffer during the decoder read operations and the encoder write operations as a temporary store for data that is being decoded or encoded. However, a buffer is not essential and the emulation prevention checking steps can be carried out effectively directly on the data stream as a new byte is being read from or written to the bitstream.

Figure 1:
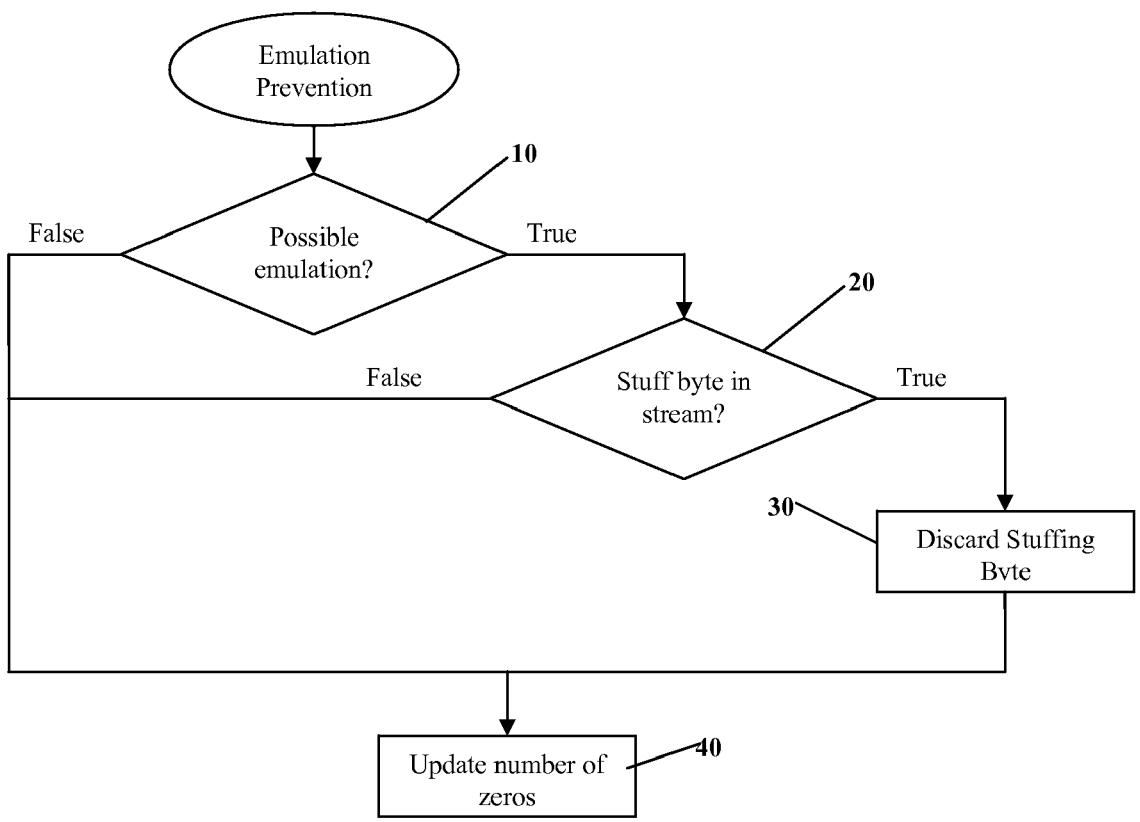
FIG. 1 shows a schematic flow diagram of a prior art method of emulation prevention.
Figure 2:
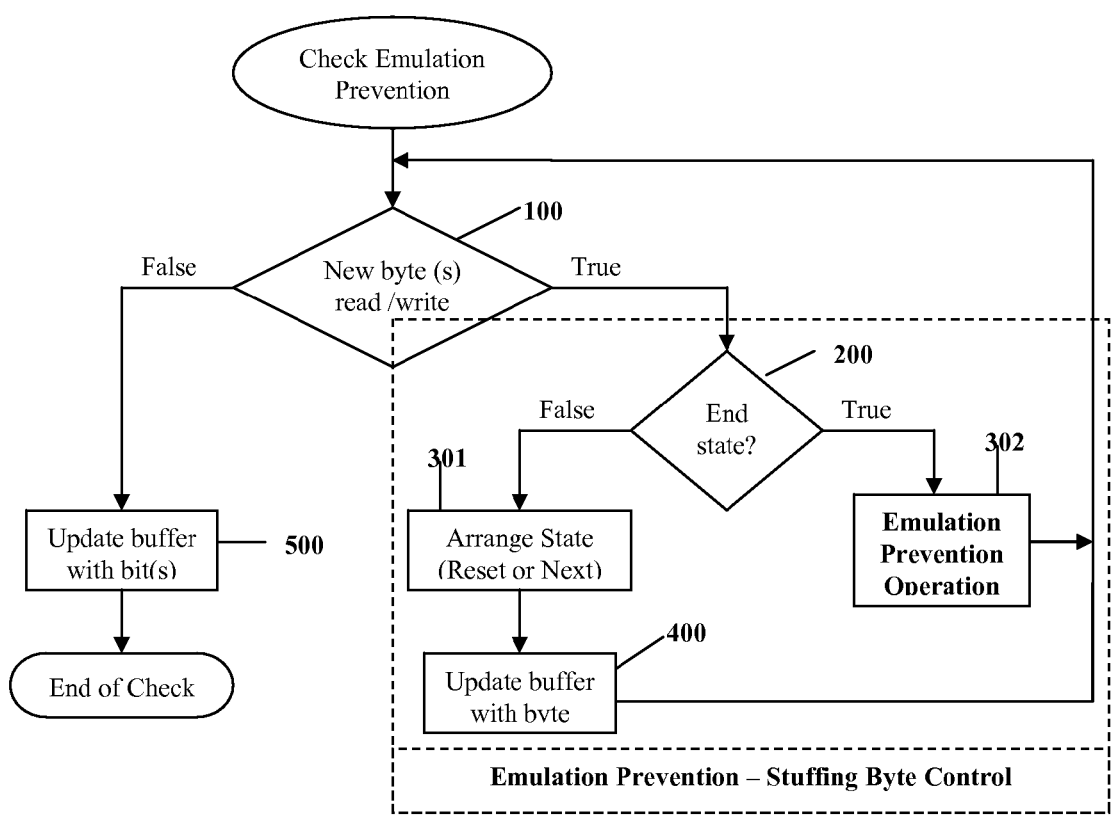
FIG. 2 shows a schematic flow diagram of an example of a method of emulation prevention in accordance with an embodiment of the invention.

Referring to FIG. 2, in overview an example of an embodiment of the invention operates as follows, this example relating to what occurs in a decoder. One or more state machines are used during the preferred decoding and encoding processes, as will be discussed in more detail below.

After or before a bitstream read/write operation, an emulation prevention/byte stuffing operation is performed. In step 100, for a bit-wise read/write call, the operation is controlled for a new byte-aligned operation. (As mentioned above, a position in a bitstream is "byte-aligned" when the position is an integer multiple of 8 bits from the position of the first bit in the bitstream.) If there is a new byte-aligned operation, emulation control is executed as will be discussed further below. Else, the bit read/write operation is executed without state change of the state machine in step 500.

In step 200, in emulation prevention control, the new byte is checked to determine if the last (end) state of the state machine has been reached even there is a stuffing byte in data sequence.

In step 301, the byte is not a stuffing byte, so the state machine is arranged according to the old state and data (the state being reset or set to the next state).

In step 302, the byte is a stuffing byte, so emulation prevention is performed. Accordingly, in this decoder example, the stuffing byte is discarded during the buffer read/write operation and the stream/buffer is updated without the stuffing byte. The iteration is performed for all of the bytes during the read/write operation with a predetermined bit length parameter.

In step 400, for none stuffing byte(s) operation, the buffer and stream updates are performed with the data byte(s). The iteration is performed for all of the bytes in the read/write operation with a predetermined bit length parameter.

In step 500, the buffer is updated with bit(s) of a non-stuffing byte element and the byte position of the stream is not changed.

Figure 3:
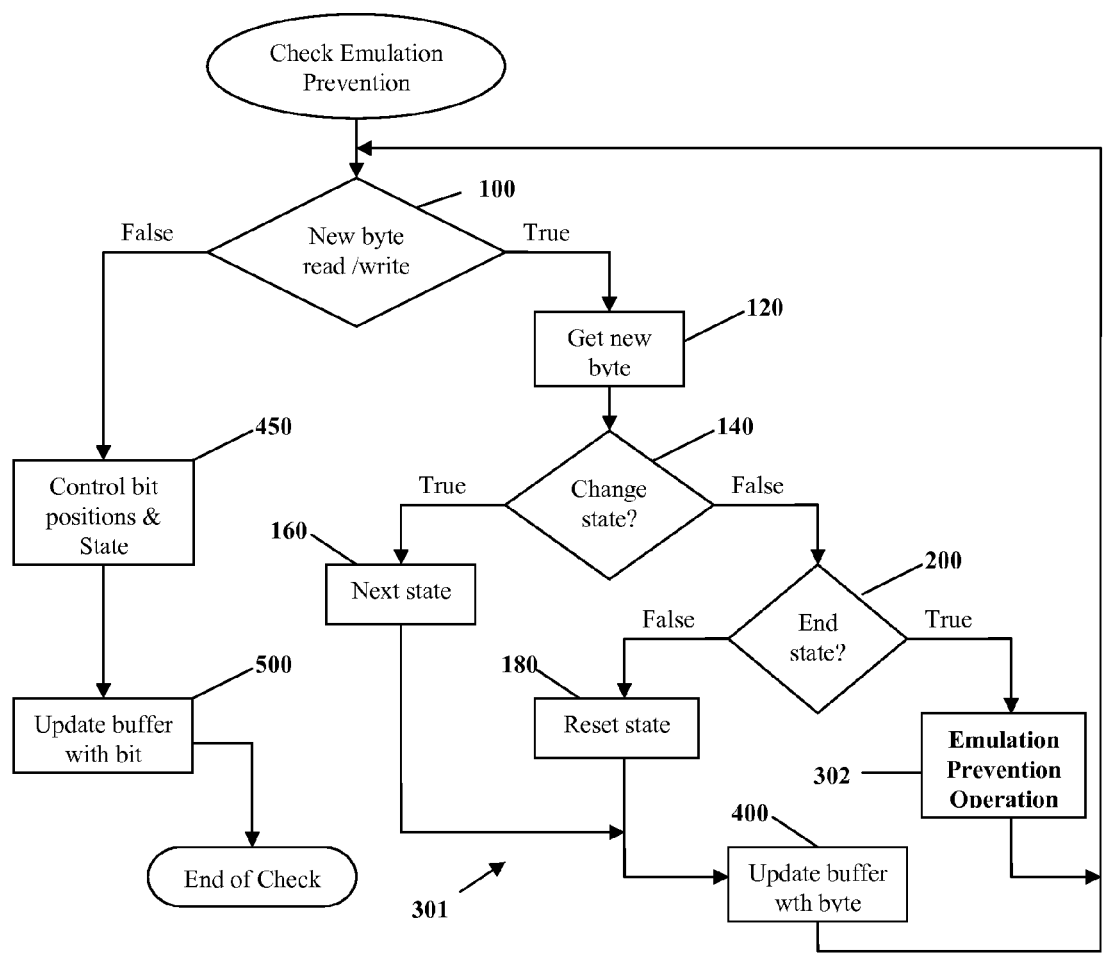
FIG. 3 shows a more detailed flow diagram of the method of FIG. 2.

Reference will now be made to FIG. 3 to discuss some of these steps in more detail. Those steps that are the same as discussed with reference to FIG. 2 will not be discussed here in detail.

If in step 100 it is determined that there is a new byte-aligned operation, then in step 120 the new byte for read/write is gathered. Else, the bit read/write operation without state change is carried out in step 450 prior to the updating of the buffer in step 500.

In step 140, the byte is controlled if there is going to be a change in state. The state variation control is done for all possible states in the state machine except the end state. For a state change to the next state, step 160 is executed.

In step 160, the intermediate steps of the state machine are executed, so the transition to the next state is provided as will be discussed further below.

In step 200, for non-intermediate states, byte data is controlled if the data is at the last state of the emulation/byte stuffing state machine. If it is not the last state data, step 180 is executed to reset the state machine. For the opposite condition, it means that there is start code emulation and this byte is a stuffing byte, so the emulation prevention procedure has to be executed in step 302.

In step 180, there is no emulation prevention byte in the byte sequence, so the state machine is reset (to state 0 in the example discussed further below).

Step 302 is the emulation prevention byte determination and operation procedure. In this step, the buffers are updated or filled without that stuffing byte and the next byte after the stuffing byte in the bitstream is used.

In step 450, in the case that there is no new byte-aligned operation, a bit-wise operation procedure is carried out such that the state machine state does not change at that part because NAL start code emulation would be in a byte-aligned position. This procedure is the pre-buffer updating part of the sub-routine for bit read/write operation. Subsequently, in step 500, the bit read/write operation is carried out according to control of the bit position and checking of the state (only for read operation).

As mentioned, the steps discussed above are carried out in the decoder during the decoding process in order to look out for stuffing bytes which have been inserted into the bitstream by an encoder in order to prevent emulation of start codes in the bitstream. In short, a state machine is used to allow checking of the presence of a stuffing byte at the same time that the buffer is updating with a byte-aligned read/write operation. By checking bytes and updating states in the state machine whilst bytes are being read or written, the speed of operation is much faster than the bit-wise pre-search of the whole bitstream as in the prior art discussed above. The steps carried out in an encoder during the encoding process are similar (i.e. look for the need to insert a stuffing byte using a state machine to track the bytes that have been read) as will be appreciated from the detailed examples given below. For example, in step 450, for the decoder side, the stuffing byte should be discarded. For that purpose only the state of the state machine is checked for the last state and the read byte. For a stuffing byte situation, the next byte's bits are fetched. For the encoder side, the bit-wise operations are ordinary bit reads/writes and nothing needs to be done in that step because the byte-aligned read/write is controlled for start code emulation. In any event, the eight bits that are filled in a byte is controlled.

Figure 4:
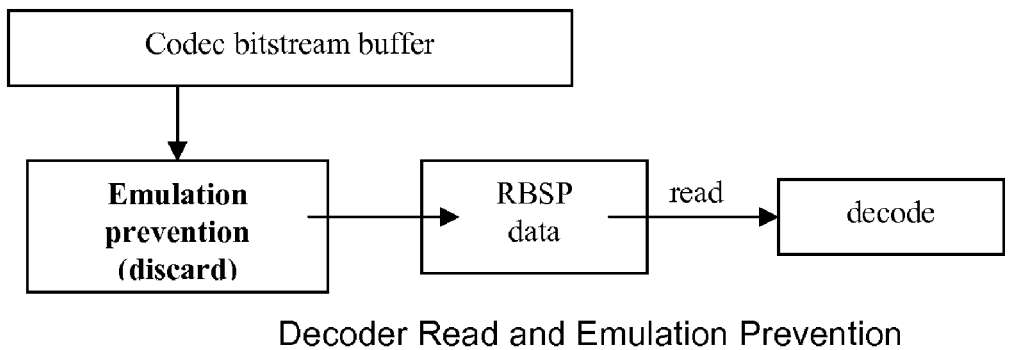
FIG. 4 shows schematically an example of the decoder read and emulation prevention in accordance with an embodiment of the invention.
Figure 5:
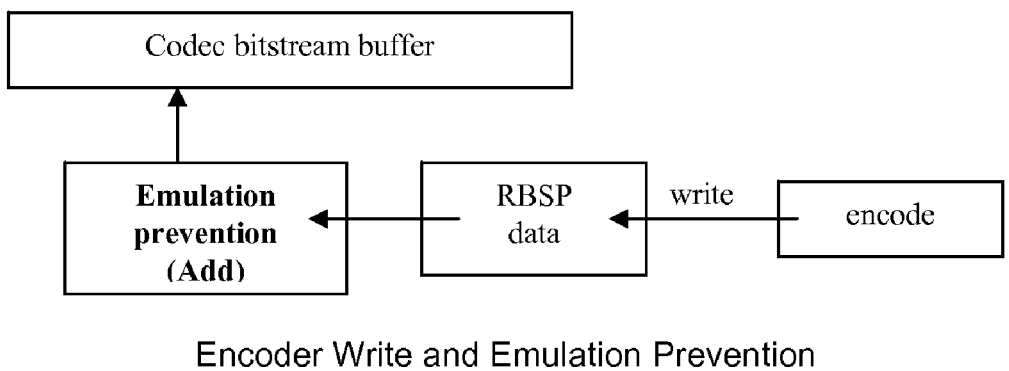
FIG. 5 shows schematically an example of the encoder write and emulation prevention in accordance with an embodiment of the invention.

Thus, as shown schematically in FIG. 4, in the decoder, bytes being read into the decoder buffer, which receives bytes from the bitstream, are monitored for the byte pattern "0x000003" and any stuffing bytes are discarded (or, equivalently, overjumped). This leaves the raw byte stream payload (RBSP) data which can then be decoder by the decoder to provide, in this case, video data for display on a display device. On the other hand and analogously, as shown schematically in FIG. 5, in the encoder, bytes from the bitstream that is encoded by the encoder are written as RBSP data which is monitored for the presence of emulated start codes (i.e. for the patterns "00000000 00000000 000000xx" where xx is a 00, 01, 10 or 11 two bit pattern). If an emulated start code is identified, a stuffing byte is added as necessary before passing the data to the buffer prior to transmission to a decoder.

Figure 6:
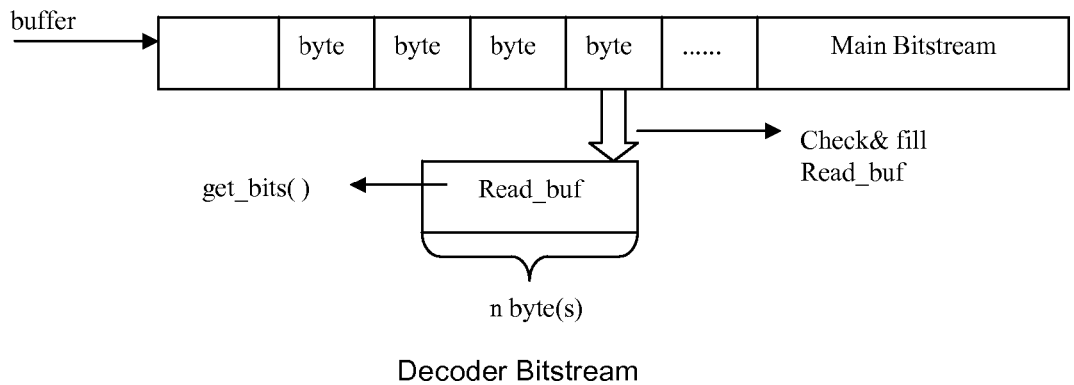
FIG. 6 shows schematically an example of the decoder bitstream and buffer operation in accordance with an embodiment of the invention.
Figure 7:
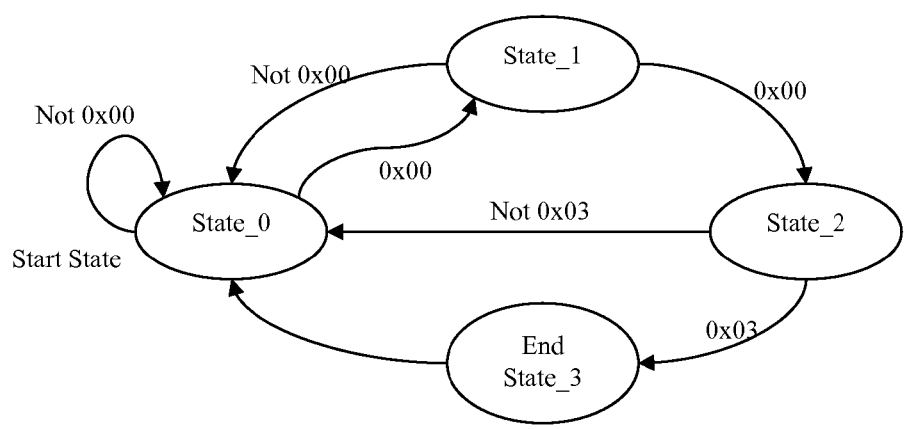
FIG. 7 shows an example of a state machine for use during decoding in accordance with an embodiment of the invention.

Referring now to FIGS. 6 and 7, an example of the operation of one example of a state machine used by a decoder in the decoding process will now be described. By way of example, the incoming bitstream may be:

Y
↓

00 00 00 01 xx xx xx xx xx 20 00 26 00 00 03 01 07 xx xx (Hex value)

where "xx" means that the value is irrelevant for this purpose. Initially, buffer pointer=0 (i.e. the buffer pointer is at byte position 0), read_Buf_0=xxxx Read_Buf_1=xxxx, and the state of the state machine is 0 (the start state State_0).

Subsequently, the buffer pointer may be at byte position Y (shown above), bit position=0, and the state of the state machine is 0. Examples of the next steps are shown in the following table:

TABLE 1

|  | Buffer pointer position | Read_Buf | State | Bit position in the byte (0-7) | Number of bits to be read |
|---|---|---|---|---|---|
| Step 1 | Y | xx 20 00 26 | 0 | 0 | 12 |
| Step 2 | Y + 1 | 00 02 60 00 | 1 | 4 | 2 |
| Step 3 | Y + 1 | 00 09 80 00 | 1 | 6 | 2 |

TABLE 1-continued

| Buffer pointer position | Read_Buf | State | Bit position in the byte (0-7) | Number of bits to be read |
|---|---|---|---|---|
| Step 4 | Y + 2 | 00 26 00 00 | 2 | 0 | 7 |
| Step 5 | Y + 4 | 13 00 00 00 | 0 | 7 | 1 |
| Step 6 | Y + 5 | 26 00 00 01 | 0 | 0 | x | xx = Don't care, *Emulation state*, Emulation prevention

In Step 1, the buffer pointer is at Y, state is 0 (the beginning state), bit position of a byte is 0, and, by way of example, 12 bits will be read from the bit stream.

In Step 2, for the 12 bits read, the buffer pointer is at Y+1 (12/8=1) and the bit position is 4 (12%8). Referring to the state machine shown in FIG. 7, the state is 1 because byte "00" is read. 2 bits will be read from the stream.

In Step 3, for the 2 bits read, the buffer pointer position does not change (bit position 4+2=6<8), and the bit position is 6 (old bit position 4+2). There is no new byte read so no change in state. 2 bits will be read.

In Step 4, for the 2 bits read, bit position is 6+2=8→0 (mod 8) so the buffer pointer position will be Y+2. The state is 2 because old state is 1 and a "00" is read. 7 bits will be read from the stream.

In Step 5, the read number is 7 and the next value (Y+3) is "03", so the byte after "03" will be obtained, i.e. the emulation prevention (stuffing) byte is detected. To prevent the emulation, the buffer pointer is moved to Y+4 (i.e. the buffer is jumped over position Y+3). Thus, after the 7 bits are read, the buffer pointer is Y+4 and the state is 0 (the state is cleared). Bit position is 0+7=7. 1 bit will be read.

In Step 6, after the 1 bit is read, the bit position is 7+1=8→0 (mod 8), so the pointer is Y+5, bit position is 0, and there is no change in state.

In summary in this example, at buffer pointer Y+2, the state is 2 and the next value is "03" so the read operation has to be discarded (or prevented). The byte "01" after the "03" has to be read as shown in example.

According to the state machine, the check_fill_ep( ) function computes the states according to incoming bytes and if the state is 2 (meaning that two "00" bytes in a row have been seen) and then the next byte is "03", the next byte after the byte "03" is read.

Figure 8:
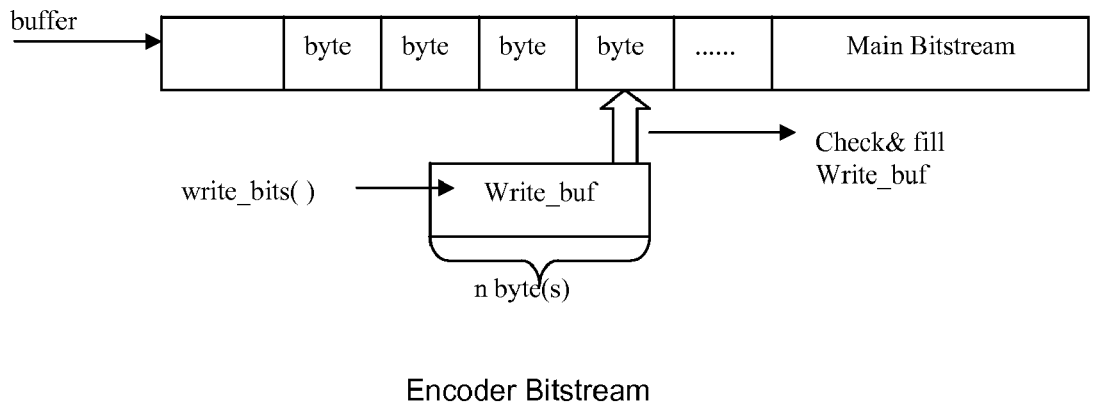
FIG. 8 shows schematically an example of the encoder bitstream and buffer operation in accordance with an embodiment of the invention; and, FIG. 9 shows an example of a state machine for use during encoding in accordance with an embodiment of the invention.
Figure 9:
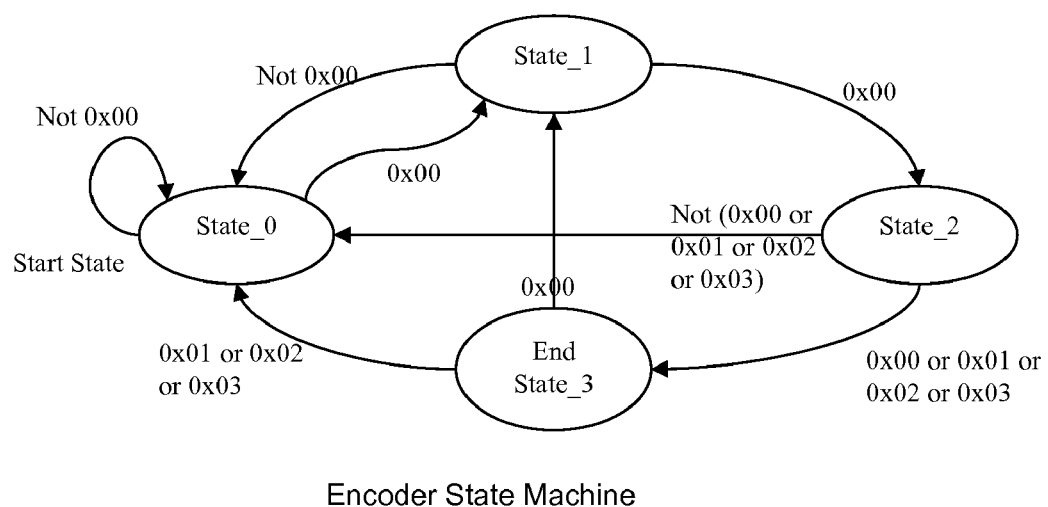

Referring now to FIGS. 8 and 9, an example of the operation of one example of a state machine used by an encoder in the encoding process will now be described. In this case, the encoder write buffer receives the write bits (from the raw byte stream payload (RBSP)) and, as the encoder write buffer fills, the bytes are written to the main bitstream for eventual onward transmission, the write buffer then being empty. The main bitstream is always written to in a byte-aligned manner and the pointer position Y is updated incrementally:

Y (always byte-aligned position)

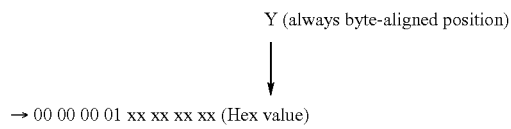

→ 00 00 00 01 xx xx xx xx (Hex value)

Buffer pointer = Y, Write_Buf_0 = xxxx, state = 0

At a later time, the buffer pointer is at Y, bit position=0, and state=0, and the next steps are shown in sequence in the following table:

TABLE 2

| Buffer pointer | Write_Buf | State | Bit position in byte (0-7) | number of bits to be written |
|---|---|---|---|---|
| Y | Empty | 0 | 0 | 12 (0x200) |
| Y | xx xx x2 00 | 0 | 4 | 4 (0x6) |
| Y | xx xx 20 06 | 0 | 0 | 7 (0x00) |
| Y | xx 10 03 00 | 0 | 7 | 1 (binary 0) |
| Y | 20 06 00 00 | 0 | 0 | 9 (0x 00 00) |
| Y | Full | | Write the temporary buffer to main stream | |
| Y + 1 | 06 00 00 xx | 0 | | MS: 00 00 00 01 xx xx xx xx 20 |
| Y + 2 | 00 00 xx xx | 0 | | MS: 00 00 01 xx xx xx xx 20 06 |
| Y + 3 | 00 xx xx xx | 1 | | MS: 00 01 xx xx xx xx 20 06 00 |
| Y + 4 | Empty | 2 | | MS: 01 xx xx xx xx 20 06 00 00 |
| | After iterations Write_Buf will get Full again | | | |
| Y + 4 | 00 00 03 FF | 2 | — | — |
| Y + 4 | Full | | Write the temporary buffer to main stream | |
| Y + 6 | 00 03 FF xx | 1 | | MS: xx xx xx 20 06 00 00 03 00 |
| Y + 5 | 03 FF xx xx | 2 | | MS: xx xx 20 06 00 00 03 00 00 |
| Y + 7 | FF xx xx xx | 0 | | MS: 20 06 00 00 03 00 00 03 03 |
| Y + 8 | Empty | 0 | | MS: 06 00 00 03 00 00 03 03 FF | xx = Don't care,
MS is Main bit Stream,
*Emulation state*, Emulation prevention

In the example above, the write operations to the main bit stream are controlled with a temporary cache buffer. When the Write_Buf becomes full, the contents of the buffer are written to the main stream whilst controlling the emulation of start codes. The Write_Buf length n in one example is 4 (i.e. a 4-byte length). However, it will be understood that in general n may be any integer value n=1, 2, 3, . . . N+.

According to the state machine for the encoder shown by way of example in FIG. 9, the check_fill_ep( ) function computes the states according to the Write_Buf bytes and, if the state is 2 (meaning that two "00" bytes have been written) and the next byte is "00" or "01" or "02" or "03", a stuffing byte "03" is inserted into the main stream. The next byte is then inserted as shown in the table above.

Embodiments of the invention have been described with particular reference to the examples illustrated. However, it will be appreciated that variations and modifications may be made to the examples described within the scope of the present invention.

The invention claimed is:

1. A method of detecting stuffing bytes in encoded data, the method comprising reading the encoded data for decoding of the data and to look for stuffing bytes in the encoded data, the method using a state machine whilst reading the encoded data to track when a stuffing byte in the encoded data is encountered, wherein the method is performed by a decoder apparatus and wherein the state machine has four states, said states being:

a first state State_0 which is a start state;
a second state State_1 to which the state machine moves in the case that the state machine was in State_0 and the next byte read is 0x00;
a third state State_2 to which the state machine moves in the case that the state machine was in State_1 and the next byte read is 0x00, else the state machine reverting to State_0 in the case that the state machine was in State_1 and the next byte read is not 0x00; and,
a fourth state State_3, which is an end state, to which the state machine moves in the case that the state machine was in State_2 and the next byte read is 0x03 where 0x03 is a stuffing byte, else the state machine reverting to State_0 in the case that the state machine was in State_2 and the next byte read is not 0x03.

2. Apparatus for detecting stuffing bytes in encoded data, the apparatus comprising a reader for reading encoded data for decoding of the data and to look for stuffing bytes in the encoded data, the apparatus having a state machine which is used whilst reading the encoded data for decoding of the data to track when a stuffing byte in the encoded data is encountered, wherein the state machine has four states, said states being:

a first state State_0 which is a start state;
a second state State_1 to which the state machine moves in the case that the state machine was in State_0 and the next byte read is 0x00;
a third state State_2 to which the state machine moves in the case that the state machine was in State_1 and the next byte read is 0x00, else the state machine reverting to State_0 in the case that the state machine was in State_1 and the next byte read is not 0x00; and,
a fourth state State_3, which is an end state, to which the state machine moves in the case that the state machine was in State_2 and the next byte read is 0x03 where 0x03 is a stuffing byte, else the state machine reverting to State_0 in the case that the state machine was in State_2 and the next byte read is not 0x03.

3. A method of inserting stuffing bytes into data that contains payload data and start codes, the method comprising writing the data for encoding of the data and to look for the presence of code that emulates said start codes, the method using a state machine whilst writing the data for encoding of the data to track when a stuffing byte needs to be inserted into the data to avoid code that emulates start codes being present in the data, wherein the method is performed by an encoder apparatus and wherein the state machine has four states, said states being:

a first state State_0 which is a start state;
a second state State_1 to which the state machine moves in the case that the state machine was in State_0 and the next byte written is 0x00;
a third state State_2 to which the state machine moves in the case that the state machine was in State_1 and the next byte written is 0x00, else the state machine reverting to State_0 in the case that the state machine was in State_1 and the next byte written is not 0x00; and,
a fourth state State_3, which is an end state, to which the state machine moves in the case that the state machine was in State_2 and the next byte written is 0x00, 0x01, 0x02 or 0x03, else the state machine reverting to State_0 in the case that the state machine was in State_2 and the next byte written is not 0x00, 0x01, 0x02 or 0x03;
and wherein, when in the fourth state State_3 and the next byte written is 0x00 the state machine moves to the second state State_1, and when in the fourth state State_3 and the next byte written is not 0x01, 0x02 or 0x03 the state machine moves to the first state State_0.

4. A method according to claim 3, wherein the state of the state machine changes if the data written for encoding of the data includes one of the bytes 0x00, 0x01, 0x02 and 0x03.

5. A method of inserting stuffing bytes into data that contains payload data and start codes, the method comprising writing the data for encoding of the data and to look for the presence of code that emulates said start codes, the method using a state machine whilst writing the data for encoding of the data to track when a stuffing byte needs to be inserted into the data to avoid code that emulates start codes being present in the data, wherein the method is performed by an encoder apparatus and wherein the state machine has four states, said states being:

a first state State_0 which is a start state;
a second state State_1 to which the state machine moves in the case that the state machine was in State_0 and the next byte written is 0x00;
a third state State_2 to which the state machine moves in the case that the state machine was in State_1 and the next byte written is 0x00, else the state machine reverting to State_0 in the case that the state machine was in State_1 and the next byte written is not 0x00; and,
a fourth state State_3, which is an end state, to which the state machine moves in the case that the state machine was in State_2 and the next byte written is 0x00, 0x01, 0x02 or 0x03, else the state machine reverting to State_0 in the case that the state machine was in State_2 and the next byte written is not 0x00, 0x01, 0x02 or 0x03;
and wherein, when in the fourth state State_3 and the next byte written is 0x00 the state machine moves to the second state State_1, and when in the fourth state State_3 and the next byte written is not 0x01, 0x02 or 0x03 the state machine moves to the first state State_0.

6. Apparatus for inserting stuffing bytes into data that contains payload data and start codes, the apparatus comprising a writer for writing the data for encoding of the data and to look for the presence of code that emulates said start codes, the apparatus having a state machine which is used whilst writing the data for encoding of the data to track when a stuffing byte needs to be inserted into the data to avoid code that emulates start codes being present in the data, wherein the state machine has four states, said states being:

a first state State_0 which is a start state;
a second state State_1 to which the state machine moves in the case that the state machine was in State_0 and the next byte written is 0x00;
a third state State_2 to which the state machine moves in the case that the state machine was in State_1 and the next byte written is 0x00, else the state machine reverting to State_0 in the case that the state machine was in State_1 and the next byte written is not 0x00; and,
a fourth state State_3, which is an end state, to which the state machine moves in the case that the state machine was in State_2 and the next byte written is 0x00, 0x01, 0x02 or 0x03, else the state machine reverting to State_0 in the case that the state machine was in State_2 and the next byte written is not 0x00, 0x01, 0x02 or 0x03;
and wherein, when in the fourth state State_3 and the next byte written is 0x00 the state machine moves to the second state State_1, and when in the fourth state State_3 and the next byte written is not 0x01, 0x02 or 0x03 the state machine moves to the first state State_0.

* * * * *